May 25, 1937.  W. T. McGINNIS  2,081,362
DISPENSING APPARATUS
Filed Dec. 8, 1934  2 Sheets-Sheet 1
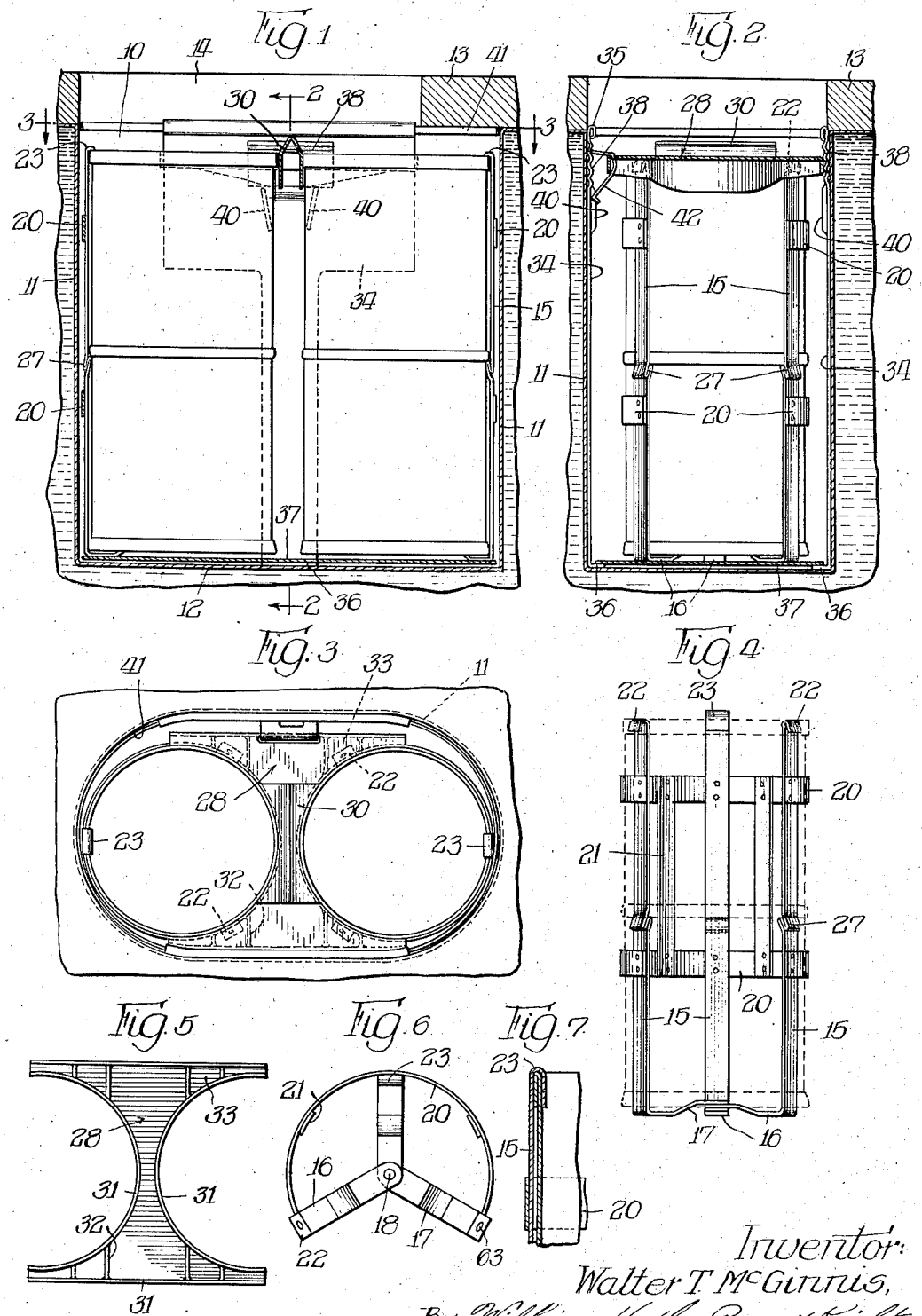

May 25, 1937.  W. T. McGINNIS  2,081,362
DISPENSING APPARATUS
Filed Dec. 8, 1934   2 Sheets-Sheet 2
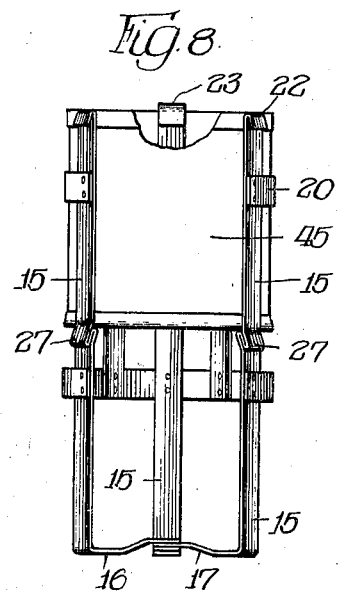
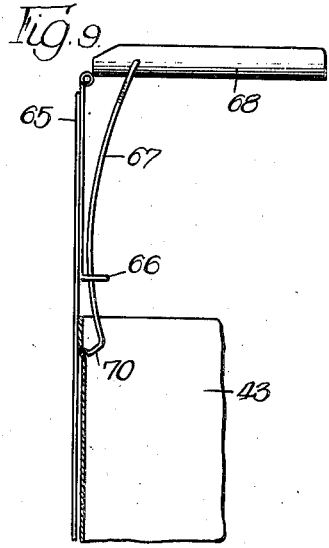
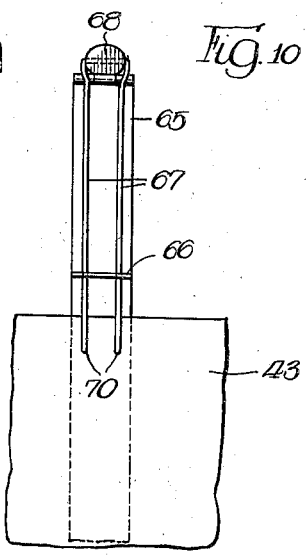
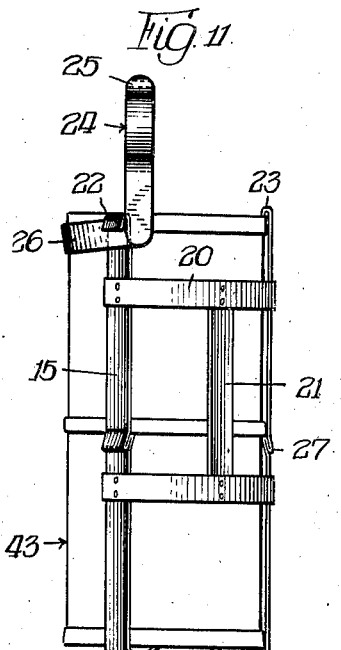
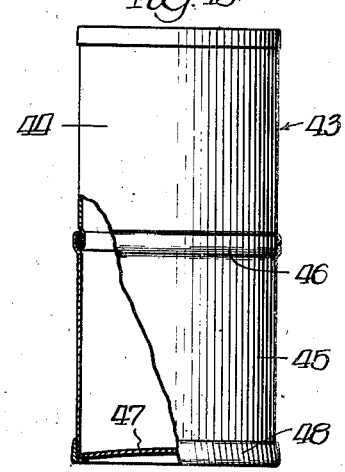
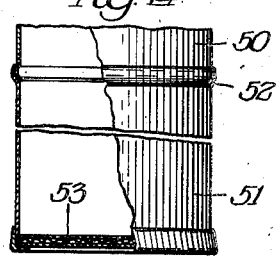
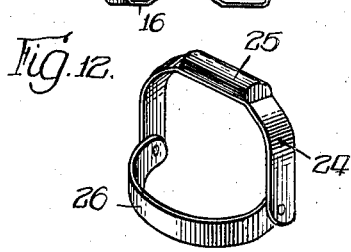
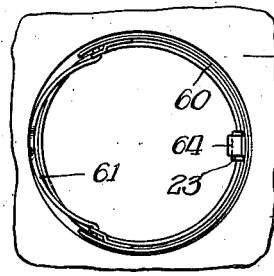
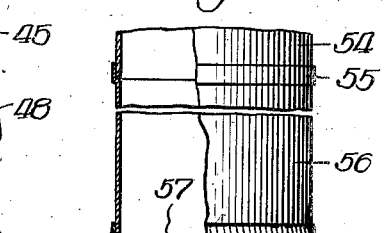
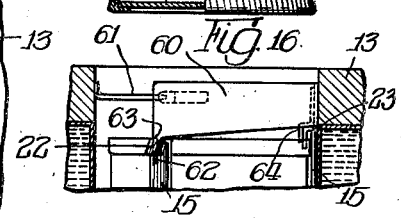
Inventor:
Walter T. McGinnis,
By Wilkinson, Huxley, Byron & Knight
Attys Registered May 25, 1937

2,081,362

UNITED STATES PATENT OFFICE 2,081,362

DISPENSING APPARATUS

Walter T. McGinnis, Chicago, Ill.

Application December 8, 1934, Serial No. 756,574

13 Claims. (Cl. 220—14)

The invention relates to dispensing devices and has particular reference to improvements in apparatus for handling ice cream and other frozen products.

The invention has for its object to provide an effective and practical apparatus for use in the dispensing of ice cream and other frozen products which will permit the use of a cardboard or other weak walled container. The invention aims to correct the deficiencies of the paper containers now in use by providing a reinforcing frame for supporting the paper container during use and which will lock the container against rotation and otherwise hold the same in fixed position within the compartment of a soda fountain or other fixture.

Another object of the invention is to provide a reinforcing frame for retaining cardboard or other weak walled container which will form a support for said walls when associated with the container although permitting ready detachment of the container therefrom. It is also possible to attach a lifting bail or handle to the present frame so that the frame and container as a unit can be readily lifted out of its compartment or inserted into the same.

Still another object is to provide a frame such as described which will be equipped with an intermediate support for retaining the containers at a point substantially half way of the frame. Difficulty has been encountered in removing the last several inches of ice cream in the standard five gallon container and especially has this been the case with respect to two-container compartments where the container is farthest removed from the storekeeper. The present invention contemplates supporting the container on the base of the frame until substantially one-half of its contents has been removed therefrom and then supporting the bottom half of the container on the intermediate supports. In this manner the contents in the bottom of the container is rendered more accessible to the person dispensing the same.

Another object of the invention resides in the provision of a paper or cardboard container which will incorporate novel features rendering the same particularly suitable for use with the present type of reinforcing frame.

With these and other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a sectional view taken longitudinally through an ice cream compartment of a soda fountain or other fixture and showing dispensing apparatus incorporating the features of the invention;

Figure 2 is a transverse sectional view taken substantially along the line 2—2 of Figure 1 showing the frame and container of the invention with means locking the unit within the compartment;

Figure 3 is a sectional view taken substantially along the line 3—3 of Figure 1;

Figure 4 is an elevational view of the reinforcing frame;

Figure 5 is a bottom plan view of the combined partition and locking plate for a pair of frame members;

Figure 6 is a bottom plan view of the frame member shown in Figure 4;

Figure 7 is a detail perspective view showing the manner of holding the upper edge of the container in the frame;

Figure 8 is an elevational view of the frame showing the bottom half of the container supported in elevated position thereon;

Figure 9 is a sectional view illustrating the operation of the lifting tool for the containers;

Figure 10 is a front elevational view of the same;

Figure 11 is a side elevational view showing a frame in associated position around a container and the lifting bail in attached relation on the frame;

Figure 12 is a perspective view of the lifting bail or handle;

Figure 13 is an elevational view, parts being shown in section, of a container embodying features of the invention;

Figures 14 and 15 are fragmentary elevational views, parts being shown in section, of a container showing modifications in the construction thereof;

Figure 16 is a sectional view through a single compartment of a soda fountain or other fixture showing locking means for a reinforcing frame; and Figure 17 is a top plan view illustrating the locking device shown in Figure 16.

Referring to Figures 1 and 2 of the drawings, an ice cream compartment 10 of a soda fountain or similar fixture is shown formed by walls 11 of copper or other suitable material which are integral with a bottom wall 12 and provide an opening of elliptical or other shape for accommodating two containers. The top of the ice cream compartment of the fixture 13 is provided with an opening 14 of elliptical shape but somewhat smaller than that of the ice cream compartment so that when two ice cream containers are located within the compartment one is fully accessible while the other is partly covered. In placing ice cream containers within an oval-shaped compartment as above described, it is necessary to first insert one and locate the same under the top 13 of the fountain and then place the second container along the side of the same. A reverse of these operations is required when the containers are removed. The use of card board or other weak walled containers for ice cream and like frozen products has not been entirely satisfactory since the containers will not retain their original shape or rigidity to permit the proper dispensing of their entire contents, and further, due to their lightness they are easily rotated or moved about within the compartment during the dispensing process. Card board containers, for example, have been found impractical especially after the major portion of their contents has been removed as their weakened walls would not allow the storekeeper to press the ice cream dipper against the walls as is customary in the dispensing of ice cream.

The invention aims to overcome the above deficiencies in the use of paper and other weak walled containers by providing a reinforcing frame, Figure 4, for detachable association with a container such as described, which will strengthen and reinforce the side walls and provide means for locking the container within the compartment to prevent rotation or other movement. One embodiment of a reinforcing frame contemplated by the invention consists of a plurality of upright strut members 15 bent at right angles at their lower ends to provide base portions 16 which are inclined upwardly at 17 centrally of the frame and pivotally connected to each other at 18. The strut members are joined by split circular bands 20 at intermediate points, which are in turn connected by auxiliary strut members 21. All the parts may be riveted, welded or otherwise securely united along their overlapping portions. The upper end of the two forward strut members 15 are bent downwardly and outwardly to form hooks 22, while the center strut member is bent to form an inside hook 23, Figure 7. The outside hooks 22 are adapted to engage with a bail or lifting handle, indicated in its entirety by 24, Figure 12, which provides a handle portion 25 and a semi-circular ring 26 adapted for engagement with the hooks, Figure 11, whereby the frame and container associated therewith can be lifted as a unit.

The container to be associated with the frame is inserted therein through the opening extending the length of the frame and provided by the split circular bands 20. The container is therefore securely held within the frame and by reason of the resiliency of the strut members 15 the side walls of the same are reinforced and strengthened so as to resist outward pressure, and to retain their original circular shape until their contents have been removed. The natural tendency of the upper end of the strut members is to bow inwardly and this action is accentuated by the pivot connection 18 joining the base end of each member.

Each strut member 15 is provided with intermediate supporting means 27 for supporting the base of the container at a point substantially half way of the frame. The intermediate supports have been designed so that they do not interfere with the insertion of the container within the frame nor with the upward movement of the container to locate the base thereof above and in engagement with said supports.

Means for locking two frames within a double ice cream compartment is shown in Figures 3 and 5 and consists of a combined locking plate and partition 28 having a shape to neatly fit between the containers supported by said frames and which is provided with a V-shaped portion 30. The partition in addition to forming locking means for the frame is also a desirable addition to the combination by reason of its sanitary features. In the event that some of the ice cream from either of the containers should drop from the scoop the plate 28 provides a table to receive the dropped portions of ice cream which would otherwise drop between the containers to the base of the compartment. The underside of plate 28, as shown in Figure 5, is provided with flanges 31 extending around the edges thereof and with connecting flanges 32 which form pockets or recesses 33. The frames are located within the double ice cream compartment to bring the two forward struts of each frame in opposing relation where the upper ends thereof provide supports on which the plate 28 is adapted to rest. Said ends of the struts fit within the pockets or recesses 33 formed on the underside of the plate so that the plate and frames are associated in a manner preventing rotation of the frame.

The locking means consists of side latching plates, as shown in Figures 1 and 2, provided with a bead 35 in the upper edge thereof and with supporting legs bent to provide a base flange 36 which is located under the auxiliary bottom plate 37 of the ice cream compartment and on which the frames rest. Each plate is provided with a plurality of ribs or corrugations 38 and with a channel 40 of decreasing width in a downward direction. The plates 34 may be constructed as an integral part of an ice cream compartment but in order to adapt existing soda fountains and other fixtures to the reinforcing frame of the invention it is necessary to provide equipment for securely holding the plates within a compartment. This consists of semi-circular rings 41 which are attached to the respective plates after they have been positioned opposite each other against the flat wall of the compartment. The bead 35 on each plate receives the rings and as they are resilient they hold the plates firmly against the walls of the container while the base flange 36 of each plate is locked under the base plate 37 in the compartment.

For locking the member 28 to the plates 34, which are in effect part of the ice cream compartment, a locking member or latch 42 is provided, which is substantially U-shaped in cross section and loosely associated with the plate, having its lower leg located within the channel 40 and its upper leg in engagement with the ribs 38. The edge of the plate opposite the locking member is also in engagement with the ribs 38 of the plate on this side of the compartment and therefore the combined partition and locking plate 28 is securely held, although the same can be readily removed, which is necessary in order to permit removal of the reinforcing frames.

Figures 13, 14, and 15 show containers which have been constructed especially for association with the reinforcing frame previously described. In Figure 13 the container 43, preferably formed of card board, consists of an upper and lower section 44 and 45, respectively, securely joined at 46 by reason of the interlocking engagement of the sections, respectively. The base of the container 47 is arched upwardly to reinforce the same, as it is desirable that the containers have a strong bottom since they are to be supported on the intermediate supports of the reinforcing frame, in which position the bottom is not otherwise supported. Rings of metal or other suitable material 48 encircle the bottom and top of the container to strengthen these sections thereof.

In Figure 14 the container consists of an upper sleeve 50 and a lower sleeve 51 which connect with each other along the beaded section 52. The base of this container is formed by a corrugated bottom member 53.

In Figure 15 the upper sleeve 54 of the container fits within an enlarged portion 55 formed by the lower sleeve 56. In the three modifications it will be observed that the upper sleeve of the container is telescoped within the lower sleeve and is thus removable from its bottom section. The construction of the container therefore carries out one of the objects of the invention, namely, a unit for dispensing ice cream or other frozen products which can be elevated when the upper half of its contents has been removed to thereby render more accessible to the storekeeper the product remaining in the container. Card board containers other than those shown in the drawings can be used with the present type of reinforcing frame in the manner outlined above, but the invention improves on these containers by providing a readily detachable upper section and a lower section having an upper reinforced edge when said section has been removed so that the same will better retain its shape. In the form of container shown in Figure 13 the turned-in edge gives double thickness of stock to reinforce the lower section of the container at this point. In the container shown in Figures 14 and 15 the edge is likewise reinforced and strengthened by the bead and flange portion respectively.

A container of ice cream or like product is delivered to the storekeeper and inserted in a reinforcing frame as has been described, whereupon the unit is placed within an ice cream container of his fountain and locked therein by the locking plate 28. It is to be understood that the locking plate can be used to lock two dispensing units embodying the feature of the invention in a double ice cream compartment or to lock one of such units and a conventional five gallon container. For single compartments the invention provides the locking member shown in Figures 16 and 17. This consists of a semi-circular band 60 pivotally connecting with the wire ring 61 which when positioned as shown in Figure 16 engages the walls of the top of the ice cream compartment of the fixture and firmly secures the band within the circular opening. The band connects with the two forward strut members of the frame by means of depending members or pins 62 which pass through openings 63 in the top of the hooks 22. The center of the split band 60 is provided with stepped flange 63 which rests on the top of the center strut member of the frame.

When the contents of the container has been removed to a point approximately level or slightly below the band 46, that is, where the upper sleeve of the container joins with the lower sleeve, which is represented by numerals 52 and 55 in the other modifications, the upper sleeve can be collapsed and in this manner detached from the lower section. The collapsed portion is then removed from the compartment and the lower section raised until the base of the container engages the intermediate support 27, as shown in Figure 8. A tool which has been found suitable for lifting the bottom half of the containers to locate them in elevated position on the frame is shown in Figures 9 and 10 and consists of a member 65 provided with an intermediate flange for receiving a pair of wire gripping members 67. The members are pivotally secured at their upper ends to a handle 68 pivoted to member 65 and are bent at their lower ends forming hooks 70. When the handle is located in a lowered position the hooks 70 are separated from member 75 and the tool can then be associated with the upper edge of the container. Upward pivotal movement of handle 68 by the operator will cause the hooks 70 to engage the walls of the container and to hold the same against member 65, whereupon the tool is bodily lifted and as a result the container is drawn upwardly therewith. Member 65 extends for the full length of the lower section of the container so that the lifting tool has firm engagement against the more solid base portion of the container. In the operation of lifting the lower half of the container the upper edge thereof is automatically located under hook 23 so that the container is held against further upward movement. As the frame is securely locked within the compartment during these operations rotation thereof does not occur nor is it possible for the frame to move upwardly since the same is also held against movement in this direction by the locking means.

It is to be understood that the present type of reinforcing frame can be used with the card board containers now on the market and is adaptable for application to a five gallon container or with two two and one-half gallon containers or even a single two and one-half gallon container. When the latter is used the same is inserted in the frame in the usual manner but is supported in the first instance on the intermediate supports so as to be in elevated position and easily accessible to the storekeeper.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. Dispensing apparatus of the character described, comprising a reinforcing frame having detachable association with a container, said frame yieldingly engaging the side walls of the container for strengthening the same, means provided by the frame for engaging the upper edge of the container to prevent movement of the same with respect to the frame in an upward direction, and intermediate supports provided by said frame for engaging the base of the container to support the same.

2. Dispensing apparatus of the character described, comprising a metal reinforcing frame having detachable association with a container, said frame yieldingly engaging the side walls of the container to strengthen the same, intermediate supports provided by said frame for engaging the base of the container for supporting the same, and means for locking the frame within a cooling compartment of a fixture.

3. Dispensing apparatus of the character described, comprising a frame having detachable association with a container, said frame including a plurality of vertical strut members yieldingly engaging the side walls of the container, intermediate supports provided by said frame for engaging the base of the container to support the same in elevated position, and hooks formed on the upper ends of certain of said strut members to provide means for lifting the same.

4. Dispensing apparatus of the character described, comprising a metal frame having detachable association with a container, said frame including a plurality of upright strut members, split circular bands joining said strut members at intermediate points, said strut members having bent lower ends to provide a base for the frame, means pivotally joining said bent ends centrally of the base, and intermediate supports provided by said frame for engaging the base of the container to support the same in elevated position.

5. Dispensing apparatus of the character described, comprising a metal frame having detachable association with a container, said frame including a plurality of upright strut members, split circular bands joining said strut members at intermediate points, said strut members having bent lower ends to provide a base for the frame, means pivotally joining said bent ends centrally of the base, the upper ends of certain of said strut members providing hooks for attaching a lifting device to said frame, and an intermediate support formed on each of said strut members for engaging with the base of the container to support the same in elevated position.

6. The combination with a cooling compartment of a fixture, of means for dispensing ice cream or like frozen products, comprising a pair of reinforcing frames adapted to have detachable association with a container respectively, said frames yieldingly engaging the side walls of their containers to strengthen the same, means for locking each frame within said cooling compartment comprising a member adapted to fit between said containers and rest on the reinforcing frame, and a latch for releasably locking the member to the side walls of the compartment.

7. The combination with a cooling compartment of a fixture, of means for dispensing ice cream or like frozen products, comprising a pair of reinforcing frames adapted to have detachable association with a container respectively, said frames yieldingly engaging the side walls of their containers to strengthen the same, means for releasably locking the units within said cooling compartment comprising a member adapted to fit between said containers and rest upon said frames, and a latching plate fixed to the side walls of the compartment, one edge of said member engaging with one latching plate and the other edge of the member carrying a latch for releasable engagement with the other latching plate.

8. The combination with the cooling compartment of a fixture, of means for dispensing ice cream or like frozen products, comprising a pair of metal reinforcing frames having detachable association with a container respectively to form a unit, said frames including a plurality of upright strut members yieldingly engaging the side walls of the container to strengthen the same, and means for releasably locking the units within the compartment including a member adapted to fit between the containers and to rest on certain strut members of each frame, and latching plates fixed to the side walls of the compartment, one edge of said member engaging with one of the latching plates and said other edge carrying a latch for releasable engagement with said other latching plate.

9. The combination with the cooling compartment of a fixture, of means for dispensing ice cream or like frozen products, comprising a pair of metal reinforcing frames having detachable association with a container respectively to form a unit, said frames including a plurality of upright strut members yieldingly engaging the side walls of the container to strengthen the same, means for releasably locking the units within the compartment including a member adapted to fit between the containers and having a plurality of pockets on its underside, said pockets receiving the ends of certain strut members when the member is supported on said frames, and a latch carried by said member for releasably locking the same to the walls of the compartment.

10. Dispensing apparatus of the character described comprising a frame having detachable association with a container, said frame including a plurality of vertical strut members yieldingly engaging the side walls of the container, intermediate supports provided by said frame for engaging the base of the container to support the same in elevated position, said strut members having bent lower ends to provide a base for the frame, means pivotally joining said bent ends centrally of the base, and means providing a bail connecting with the upper end of said frame.

11. Dispensing apparatus of the character described comprising a reinforcing frame having detachable association with a container, said frame including a plurality of vertical strut members yieldingly engaging the side walls of the container, intermediate supports provided by said frame for engaging the base of the container to support the same in elevated position, said strut members having bent lower ends to provide a base for the frame, means pivotally joining said bent ends centrally of the base, and means provided by said frame for engaging the upper edge of the container to prevent movement of the same with respect to the frame in an upward direction.

12. Dispensing apparatus of the character described comprising a reinforcing frame having detachable association with a container, said frame including a plurality of vertical strut members yieldingly engaging the side walls of the container, intermediate supports provided by said frame for engaging the base of the container to support the same in elevated position, said strut members having bent lower ends to provide a base for the frame, means pivotally joining said bent ends centrally of the base, means provided by the frame for engaging the upper edge of the container to prevent movement of the same with respect to the frame in an upward direction, and a bail connecting with the upper end of the frame.

13. The combination with a cooling compartment of a fixture, of means for dispensing ice cream and like frozen products, comprising a pair of metal reinforcing frames having detachable association with a container respectively to form a unit, said frames including a plurality of upright strut members yieldingly engaging the side walls of the container to strengthen the same, means for releasably locking the units within the compartment including a member having engagement with the upper end of each metal reinforcing frame to prevent rotation of said frame within the cooling compartment, and a latch carried by said member for releasably locking the same to the walls of the compartment.

WALTER T. McGINNIS.